Feb. 15, 1927.　　　F. E. WOLCOTT　　　1,617,559
ELECTRIC TOASTER
Filed May 8, 1926　　　2 Sheets-Sheet 1

INVENTOR:
Frank E. Wolcott
BY Harry P. Williams
ATTORNEY.

Feb. 15, 1927. 1,617,559
F. E. WOLCOTT
ELECTRIC TOASTER
Filed May 8, 1926  2 Sheets-Sheet 2
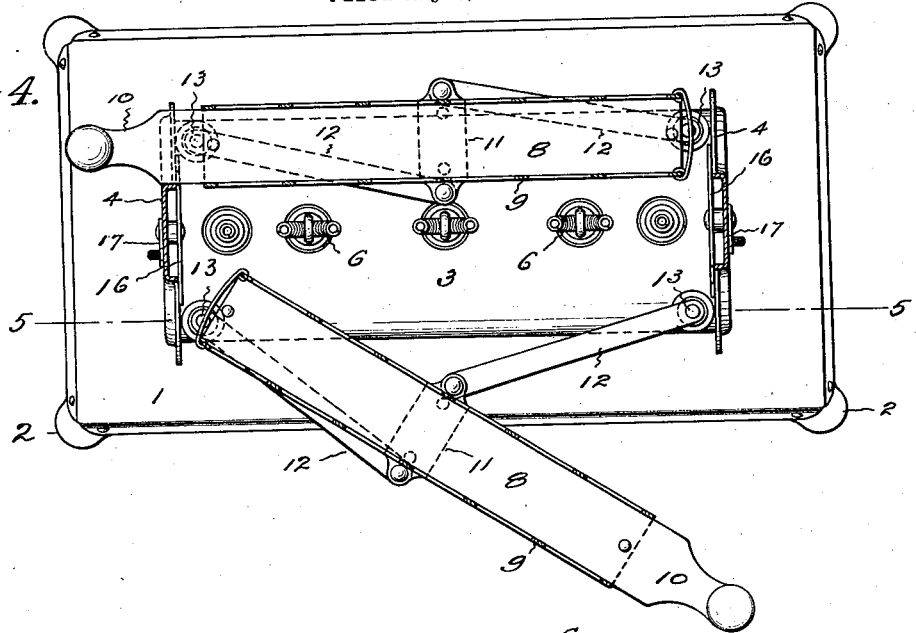
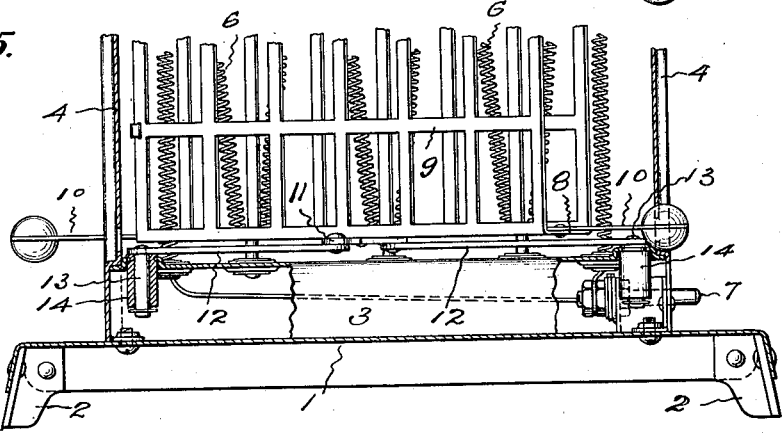
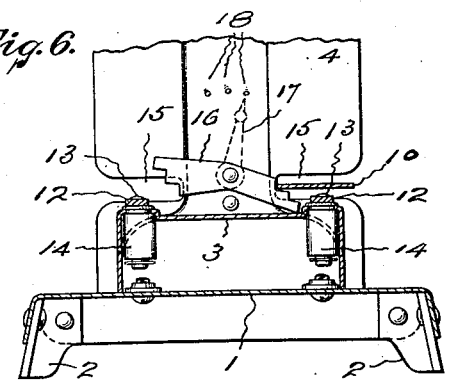
INVENTOR:
Frank E. Wolcott
BY Harry R. Williams
ATTORNEY.

Patented Feb. 15, 1927.

1,617,559

UNITED STATES PATENT OFFICE.

FRANK E. WOLCOTT, OF WEST HARTFORD, CONNECTICUT, ASSIGNOR TO THE FRANK E. WOLCOTT MANUFACTURING COMPANY, OF HARTFORD, CONNECTICUT, A CORPORATION OF CONNECTICUT.

ELECTRIC TOASTER.

Application filed May 8, 1926. Serial No. 107,581.

This invention relates to the type of electric toasters which have two horizontally swinging food carriers, one on each side of the heating element, which carriers are so supported that when swung from side to side they automatically reverse and expose opposite surfaces of the substance being toasted to the heating element.

The object of the invention is to provide a toaster of this type in which the carriers are connected with the frame at the bottom only, leaving the tops of the carriers wide open and free from the frame, which arrangement cheapens the construction, and facilitates the insertion of bread into and removal of toast from the carriers. Also to so construct the frame that the side plates will extend over and conceal the edges of the carriers, when they are in closed position, in order to improve the appearance of the toaster, make it more rugged and tend to concentrate the heat upon the matter being toasted. And further to arrange means whereby the carriers may be retained at different distances from the heating element for the purpose of controlling the effect of the heat, or permitting a quick or slow toasting of the bread.

Figure 1:
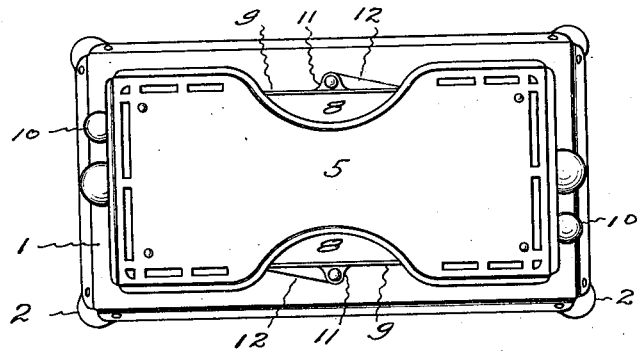
Figure 2:
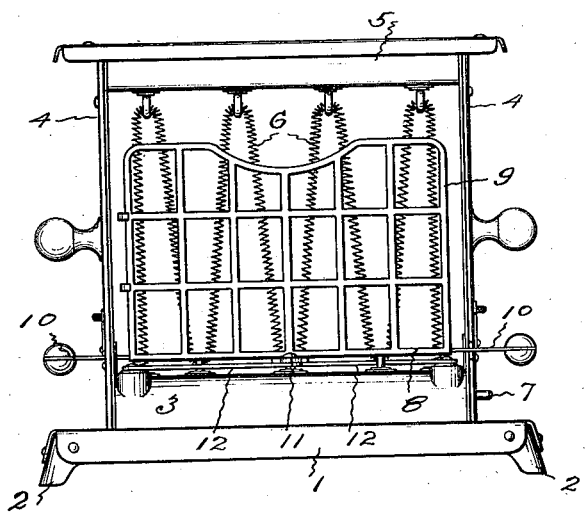
Figure 3:
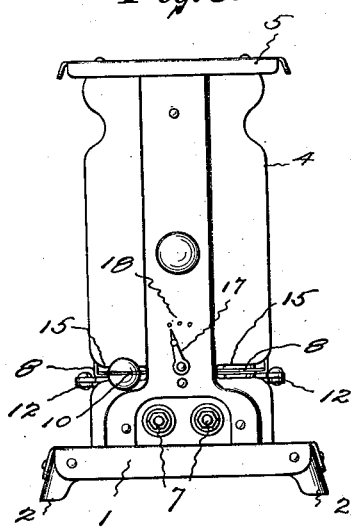

In the accompanying drawings Fig. 1 shows a plan of a toaster that embodies the invention. Fig. 2 is a front elevation of the same. Fig. 3 is a side elevation. Fig. 4 is a plan on larger scale with the top plate of the frame removed and the side plates of the frame in section, showing the open top carriers and how they are supported and swing. Fig. 5 is a front view of the lower part of the toaster with the frame and base in section. Fig. 6 is a section of the lower part of the toaster showing the bearings for the carrier supports and the means for holding the carriers at various distances from the heating element.

The base 1 is formed of sheet metal and has supporting feet 2 at its corners. The frame comprising a bottom 3, side plates 4 and top 5 is fastened to the upper surface of the base. The heating element consisting of resistance wire 6 is rove back and forth between the bottom and top of the frame, with its terminals connected with the usual plug attachment pins 7.

Each of the carriers has a bottom 8 with two grills 9 rising therefrom. A manipulating handle 10 is fastened to one end of the bottom of each of the carriers. A stiff plate 11 is secured to the bottom, near the middle, of each of the carriers, and to these plates beyond the sides of the carriers links 12 are hinged. These links are desirably flat rigid strips of sheet metal and are attached to studs 13 pivoted in extended bearing hubs 14 at each side of the bottom of the frame. When a handle is turned from one side of the frame to the other the supporting links cause the carrier to swing out and reverse so that the opposite surface of whatever is in the carrier is presented to the heating element. By connecting the links in this manner and making them of sufficient stiffness, and mounting the pivot studs which connect the links with the frame in long bearing hubs, as shown, the reversible carriers may be supported entirely from below, leaving the tops of the carriers free and open, as well as one side, so that there will be no obstruction above or at one side to interfere with the free placing of the bread in the carriers or removal of the toast therefrom. Supporting the carriers from the bottom only, saves material, as well as time and labor in the manufacture of the toaster, and eliminates parts that have to be carefully fitted and are liable to become bent and interfere with the easy and quick manipulation of the carriers.

The side plates 4 of this toaster are made of such width that when the carriers are closed they cover the edges of the carrier, and not only add to the rigidity of the frame, but they tend to concentrate the heat from the heating element onto the matter to be toasted, as well as conceal the unsightly edges of the carriers and the matter contained therein so as to present a pleasing appearance.

In order to allow the carriers to close way in parallel with the plane of the heating element, notches 15 are formed in the edges near the bottom of the side plates to permit the handles to enter. Figs. 3, 6. These notches are desirably so deep that their inner end walls form stops against which the carrier handles strike when the carriers are fully closed. In order to stop the carriers at different distances from the heating element latches 16 may be pivoted to the inner surfaces of the side plates opposite the notches, which latches can be provided with a pointer 17 that may be turned to the three indicated positions 18. When a pointer is in one position the latches are so turned that the carrier may be fully closed, when in another position the latches engage the handle and stop the carrier at a little distance from the heating element, and when the pointer is in the third position the latches stop the carriers at a still further distance from the heating element. Thus the distance of the carrier from the heating element may be determined according to whether it is desired to obtain a quick toasting, a slow toasting or to considerably retard the toasting, of the substance in the carriers.

The invention claimed is:—

1. A reversible electric toaster comprising a base, a vertical frame mounted on the base, a heating element supported in the frame, a horizontally swinging toast carrier open at the top and one side, and a pair of links pivotally connected to the bottom near the middle at each side of the carrier and respectively pivotally connected to the frame near the opposite sides, said links forming the sole support for the carrier and its only connection with the frame.

2. A reversible electric toaster comprising a base, a vertical frame mounted on the base, a heating element supported in the frame, a horizontally swinging toast carrier open at the top and one side, a handle for swinging said carrier, and a pair of links pivotally connected to the bottom near the middle at each side of the carrier and respectively pivotally connected to the frame near the opposite sides, the side plate of said frame extending beyond the edges of said carrier when the carrier is fully closed, with notches in said plate to receive the handle and thus permit the carrier to swing close to the heating element.

3. A reversible electric toaster comprising a base, a vertical frame mounted on the base, a heating element supported by the frame, a horizontally swinging toast carrier, a link pivotally connected to the bottom of the carrier near the middle on one side and pivotally connected to the frame on one side, and a link pivotally connected to the bottom of the carrier near the middle on the other side and pivotally connected to the frame at the other side, said links forming the sole support of the carrier.

4. A reversible electric toaster comprising a base, a vertical frame mounted on the base, a heating element supported in the frame, a horizontally swinging toast carrier, a pair of links respectively pivoted to the bottom near the middle at each side of the center of the carrier and pivotally connected to the frame near the opposite sides, whereby said links form the support and reversing means for the carrier when it is turned.

5. A reversible electric toaster comprising a base, a vertical frame mounted on the base, a heating element supported in the frame, a horizontally swinging toast carrier open at the top and one side, links pivotally connected to the bottom near the middle at each side of the carrier and respectively pivotally connected to the frame near the opposite sides, latches pivoted to the frame for limiting the closing movements of the carrier, and means on the outside of the frame for adjusting the latches.

6. A reversible electric toaster comprising a vertical frame, a heating element supported in the frame, a horizontally swinging toast carrier, means pivotally connecting the bottom of the carrier to the frame, a handle for swinging the carrier from side to side, and a latch pivoted to the lower part of each side of the frame and adapted to engage said handle and determine the position of the carrier with relation to the heating element.

7. An electric toaster comprising a frame, the side plates of said frame having notches near the bottom, a heating element supported by the frame, a toast carrier connected to the frame and movable toward and from the heating element, a handle for moving the carrier, said handle being adapted to swing into and out of said notches in the frame and adjustable latches pivoted to the sides of the frame for determining the position of said handle in the notches.

8. A reversible electric toaster comprising a frame, a heating element supported by the frame, a horizontally swinging toast carrier, and means pivotally connected to the bottom near the middle at each side of the carrier, said means being pivotally connected to the frame near the sides thereof and forming the sole support for the carrier and its only connection with the frame.

9. A reversible electric toaster comprising a vertical frame, a heating element supported in the frame, a horizontally swinging reversible toast carrier, supporting and reversing means pivotally connecting the carrier to the frame, and adjustable means attached to each side of the frame and adapted to engage the carrier and retain it at different distances from the heating element in both positions to which it may be swung.

FRANK E. WOLCOTT.